(12) United States Patent
Cremin et al.

(10) Patent No.: US 11,743,261 B2
(45) Date of Patent: Aug. 29, 2023

(54) PREVENTING COUNTERFEIT COMMUNICATION DEVICES FROM ACCESSING RESOURCES

(71) Applicant: Afilias Technologies Limited, Dublin (IE)

(72) Inventors: Ronan Cremin, Dublin (IE); John Leonard, Dublin (IE)

(73) Assignee: DEVICEATLAS LIMITED, Dublin (IE)

( * ) Notice: Subject to any disclaimer, the term of this patent is extended or adjusted under 35 U.S.C. 154(b) by 0 days.

(21) Appl. No.: 17/131,440

(22) Filed: Dec. 22, 2020

(65) Prior Publication Data
US 2021/0112061 A1  Apr. 15, 2021

Related U.S. Application Data

(62) Division of application No. 16/644,725, filed as application No. PCT/GB2017/052584 on Sep. 5, 2017, now Pat. No. 11,178,149.

(51) Int. Cl.
*H04L 9/40* (2022.01)
*H04L 67/02* (2022.01)
*H04W 12/12* (2021.01)

(52) U.S. Cl.
CPC .............. *H04L 63/10* (2013.01); *H04L 63/08* (2013.01); *H04L 63/14* (2013.01); *H04L 67/02* (2013.01); *H04W 12/12* (2013.01)

(58) Field of Classification Search
CPC ......... H04L 63/08; H04L 63/10; H04L 63/14; H04L 67/02; H04W 12/12
See application file for complete search history.

(56) References Cited

U.S. PATENT DOCUMENTS

| | | | |
|---|---|---|---|
| 9,106,693 B2 | 8/2015 | Quinlan et al. | |
| 9,107,076 B1 * | 8/2015 | Zang | H04W 12/122 |
| 9,769,671 B1 * | 9/2017 | Obaidi | H04W 12/12 |
| 10,248,782 B2 * | 4/2019 | Hussain | H04L 63/0876 |

(Continued)

OTHER PUBLICATIONS

Maji, Giridhar and Soumya Sen. "A Data warehouse based analysis on CDR to depict market share of different mobile brands." 2015 Annual IEEE India Conference (INDICON): 1-6. (Year: 2015).*

(Continued)

*Primary Examiner* — John M MacIlwinen
(74) *Attorney, Agent, or Firm* — Haynes and Boone, LLP

(57) ABSTRACT

A method of preventing a subject communication device $102_{1\ldots N}$ from accessing a resource when it is determined to be counterfeit. The method involves delivering the web page component to a subject communication device $102_{1\ldots N}$ in response to a request. The web page component is adapted to retrieve actual values of a plurality of attributes from the subject communication device $102_{1\ldots N}$. Reference values of the plurality of attributes are retrieved from a device property store 110 and the method determines that the subject communication device $102_{1\ldots N}$ is counterfeit when at least one of the actual values of the plurality of attributes is different to the reference value of that attribute.

17 Claims, 5 Drawing Sheets

(56) References Cited

U.S. PATENT DOCUMENTS

| | | | |
|---|---|---|---|
| 2010/0130172 A1* | 5/2010 | Vendrow | G06Q 20/4016 |
| | | | 455/411 |
| 2010/0130254 A1* | 5/2010 | Kamada | H04W 12/06 |
| | | | 455/558 |
| 2011/0099480 A1* | 4/2011 | Sama | G06F 9/44505 |
| | | | 715/736 |
| 2014/0081876 A1* | 3/2014 | Schulz | G06Q 10/20 |
| | | | 705/305 |
| 2014/0099928 A1* | 4/2014 | Caldwell | H04W 12/126 |
| | | | 455/411 |
| 2015/0127825 A1 | 5/2015 | Johannsen | |
| 2017/0339178 A1* | 11/2017 | Mahaffey | G06F 11/3452 |
| 2020/0267154 A1 | 8/2020 | Cremin et al. | |

OTHER PUBLICATIONS

Grzonkowski, Slawomir, et al. "Smartphone Security: An overview of emerging threats." IEEE Consumer Electronics Magazine 3.4 : 40-44. (Year: 2014).*

Netbiscuits GMBH: "Device Detection", Mar. 31, 2014 (Mar. 31, 2014), pp. 1-5, XP055292800, Retrieved from the Internet: URL:http://web.archive.org/web/20150913044642/http://www.netbiscuits.com/wp-content/uploads/2014/04/Netbiscuits-Device-Detection-Technical-Overview.pdf> [retrieved on Aug. 2, 2016].

* cited by examiner

PREVENTING COUNTERFEIT COMMUNICATION DEVICES FROM ACCESSING RESOURCES

CROSS-REFERENCE TO RELATED APPLICATIONS

This application is a divisional of U.S. patent application Ser. No. 16/644,725, filed Mar. 5, 2020, now pending, which is a national stage of PCT/GB2017/052584, filed Sep. 5, 2017, now expired, the entire contents of each of which is hereby incorporated herein by express reference thereto.

FIELD OF THE DISCLOSURE

The present disclosure relates to selectively preventing communication devices from accessing a resource. It has particular application to preventing a counterfeit communication device from accessing a resource such as a web resource or network resource.

BACKGROUND TO THE DISCLOSURE

Communication devices having web browsers for retrieving information from the Web broadly fall into two categories: desktop computers and mobile devices. Counterfeits of both these types of communication device are increasingly available to consumers, but in particular counterfeit mobile communication devices.

Counterfeit communication devices tend to be of inferior quality, often having sub-standard components or running incorrect software. This leads to problems for users, who encounter problems using their counterfeit communication device. These problems might be readily apparent, such as a low quality display, short battery life or poor performance. In other cases the problems may not be immediately apparent, such as a fake fingerprint sensor that allows access to a device with any fingerprint or software running in the background that leaks private information to a third party. Indeed, some counterfeit communication devices are even dangerous to use, because, for example, they have poor quality batteries that are likely to overheat or cause a fire, or because they expose users to unnecessarily high levels of electromagnetic radiation. Counterfeit communication devices also create problems for manufacturers and service providers, not just through loss of revenue from lost sales, but due to having to deal with enquiries from users having problems using counterfeit communication devices. Counterfeit mobile communication devices also often perform poorly in a mobile communication network, causing unusually high interference with other devices, using excessive amounts of the available bandwidth and unexpectedly dropping calls and data connections.

In order to address this, attention has so far largely been focused on limiting the distribution of counterfeit communication devices. For example, with the assistance of government agencies, efforts have been made to intercept shipments of counterfeit communication devices. Attempts have also been made to educate consumers so that they do not unintentionally or knowingly purchase counterfeit communication devices. These measures have not been entirely successful.

More recently, it has been proposed to block a communication device from operating on a network if it appears to be counterfeit. For example, it has been proposed to block mobile communication devices that have an invalid International Mobile Equipment Identity (IMEI) number. This can be useful, but since many counterfeit devices carry a valid IMEI number, albeit a duplicate or stolen one, the method has not proven to be a reliable way of blocking many counterfeit mobile communication devices. More generally, as counterfeit devices become more sophisticated, they increasingly mimic device identifiers, such as IMEI numbers or User Agent strings, and device capabilities, such as software versions, without perceivable error. It is therefore becoming ever more difficult to distinguish counterfeit and genuine devices from one another.

The present disclosure seeks to overcome or ameliorate these difficulties.

SUMMARY OF THE DISCLOSURE

According to a first aspect of the present disclosure, there is provided apparatus for preventing access to a resource, the apparatus comprising a processor arranged to:
 receive a request from a subject communication device for access to the resource;
 cause transmission of computer executable code to the subject communication device, which computer executable code is arranged, when executed by the subject communication device, to retrieve from the subject communication device actual values of a plurality of attributes of the subject communication device and to transmit the actual values of the plurality of attributes to the apparatus;
 receive the actual values of the plurality of attributes from the subject communication device;
 retrieve from a device property store reference values of the plurality of attributes;
 compare the actual values to the reference values to identify a group of attributes for which the actual values and the reference values do not match;
 retrieve from the device property store confidence parameters for the reference values of the group of attributes; and
 prevent the subject communication device from accessing the network resource in response to a determination based on the retrieved confidence parameters.

According to a second aspect of the present disclosure, there is provided a method of preventing access to a resource, the method comprising:
 receiving a request from a subject communication device for access to the resource;
 causing transmission of computer executable code to the subject communication device, which computer executable code is arranged, when executed by the subject communication device, to retrieve from the subject communication device actual values of a plurality of attributes of the subject communication device and to transmit the actual values of the plurality of attributes to the apparatus;
 receiving the actual values of the plurality of attributes from the subject communication device;
 retrieving from a device property store reference values of the plurality of attributes along with a confidence parameter for each of the reference values;
 determining a confidence score for the subject communication device by comparing the actual values to the reference values and selectively combining the confidence parameters based on the comparison; and
 preventing the subject communication device from accessing the resource based on the comparison and the confidence score.

According to a third aspect of the present disclosure, there is provided a network comprising the apparatus and the subject communication device described above, wherein the subject communication device comprises a processor and a memory storing instructions that, when executed by the processor, cause the processor to:

receive the computer executable code and execute the code to retrieve from the subject communication device actual values of a plurality of attributes of the subject communication device and to transmit the actual values of the plurality of attributes to the apparatus.

Optionally, the instructions cause the processor to:

receive identity information representing the identity of the subject communication device; and select the reference values of the plurality of attributes for retrieval from the device property store based on the identity information.

The request received from the subject communication device may include the identity information.

The identity information may be a portion of an Hypertext Transfer Protocol (HTTP) header of the request, such as a User Agent string.

Optionally, the instructions cause the processor to receive the identity information from a mobile communication network via which the processor receives the request from the subject communication device.

The identity information may an International Mobile Station Equipment Identity, IMEI, or Type Allocation Code, TAC, of the subject communication device.

In one example, the instructions cause the processor to determine the confidence score by comparing the actual values to the reference values to identify a group of attributes for which the actual values and the reference values do not match, and by selecting the confidence parameters of the reference values of the attributes of the group for combination.

In another example, the instructions cause the processor to determine the confidence score by comparing the actual values to the reference values to identify a group of attributes for which the actual values and the reference values match, and by selecting the confidence parameters of the reference values of the attributes of the group for combination.

Optionally, the instructions may cause the processor to:
compare the confidence score to a threshold; and
prevent the subject communication device from accessing the resource in response to the comparison.

The instructions may alternatively cause the processor to determine the confidence score by applying a weighting to each of the confidence parameters and by combining the confidence parameters based on the applied weightings.

The weightings may be retrieved from the device property store.

Optionally, the instructions cause the processor to prevent the subject communication device from accessing the resource by transmitting a web page component to the subject communication device, which web page component causes the subject communication device to transmit an indication that it is prevented from accessing the resource.

The computer executable code may be executable by a web browser of the subject communication device. Additionally or alternatively, the computer executable code comprises an application executable by the operating system of the subject communication device.

The computer executable code may comprise first instructions executable by a processor of the subject communication device to retrieve one or more actual values stored by the subject communication device and second instructions executable by the subject communication device to test a component of the subject communication device to determine an actual value representative of performance of the component.

According to a fourth aspect of the present disclosure, there is provided apparatus for determining that a subject communication device is counterfeit, the apparatus comprising a processor and a memory storing instructions that, when executed by the processor, cause the processor to:

receive a request from the subject communication device for a web page component, the request including first identity information representing the identity of the subject communication device;

receive second identity information representing the identity of the subject communication device;

retrieve first reference values of a plurality of attributes from a device property store based on the first identity information;

retrieve second reference values of the plurality of attributes from a device property store based on the second identity information;

compare the first reference values of each of the plurality of attributes to the second reference values of each of the plurality of attributes respectively; and determine that the subject communication device is counterfeit when based on one or more of the first reference values of the plurality of attributes being different to the second reference value of that attribute.

According to a fifth aspect of the present disclosure there is provided a method of determining that a subject communication device is counterfeit, the method comprising:

receiving a request from a subject communication device for a web page component, the request including first identity information representing the identity of the subject communication device;

receiving second identity information representing the identity of the subject communication device;

retrieving first reference values of a plurality of attributes from a device property store based on the first identity information;

retrieving second reference values of the plurality of attributes from a device property store based on the second identity information;

comparing the first reference values of each of the plurality of attributes to the second reference values of each of the plurality of attributes respectively; and determining that the subject communication device is counterfeit when based on one or more of the first reference values of the plurality of attributes being different to the second reference value of that attribute.

Optionally, the instructions cause the processor to request the second identity information from a mobile communication network via which the request is received from the subject communication device, and the second identity information is received from the mobile communication network.

The second identity information may be an International Mobile Station Equipment Identity, IMEI, or Type Allocation Code, TAC, of the subject communication device. The second identity information may be a portion of an Hypertext Transfer Protocol (HTTP) header of the request, such as a User Agent Profile (UAProf) header.

The first identity information may be a portion of an Hypertext Transfer Protocol (HTTP) header of the request, such as a User Agent string.

Optionally, the apparatus includes the device property store, wherein the device property store comprises reference values for the plurality of attributes for different sample communication devices, the reference values belonging to each different sample communication device being indexed by the first identity information associated with the respective sample communication device and also being indexed by the second identity information associated with sample communication device.

Use of the words "apparatus", "server", "communication device", "processor" and so on are intended to be general rather than specific. Whilst these features of the disclosure may be implemented using an individual component, such as a computer or a central processing unit (CPU), they can equally well be implemented using other suitable components or a combination of components. For example, they could be implemented using a hard-wired circuit or circuits, e.g. an integrated circuit, or using embedded software.

It can also be appreciated that the method can be implemented, at least in part, using computer program code. According to another aspect of the present disclosure, there is therefore provided computer software or computer program code adapted to carry out the method described above when processed by a computer processing means. The computer software or computer program code can be carried by computer readable medium. The medium may be a physical storage medium such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The disclosure also extends to a processor running the software or code, e.g. a computer configured to carry out the method described above.

A preferred embodiment of the invention is described below, by way of example only, with reference to the accompanying drawings.

DESCRIPTION OF PREFERRED EMBODIMENTS

Figure 1:
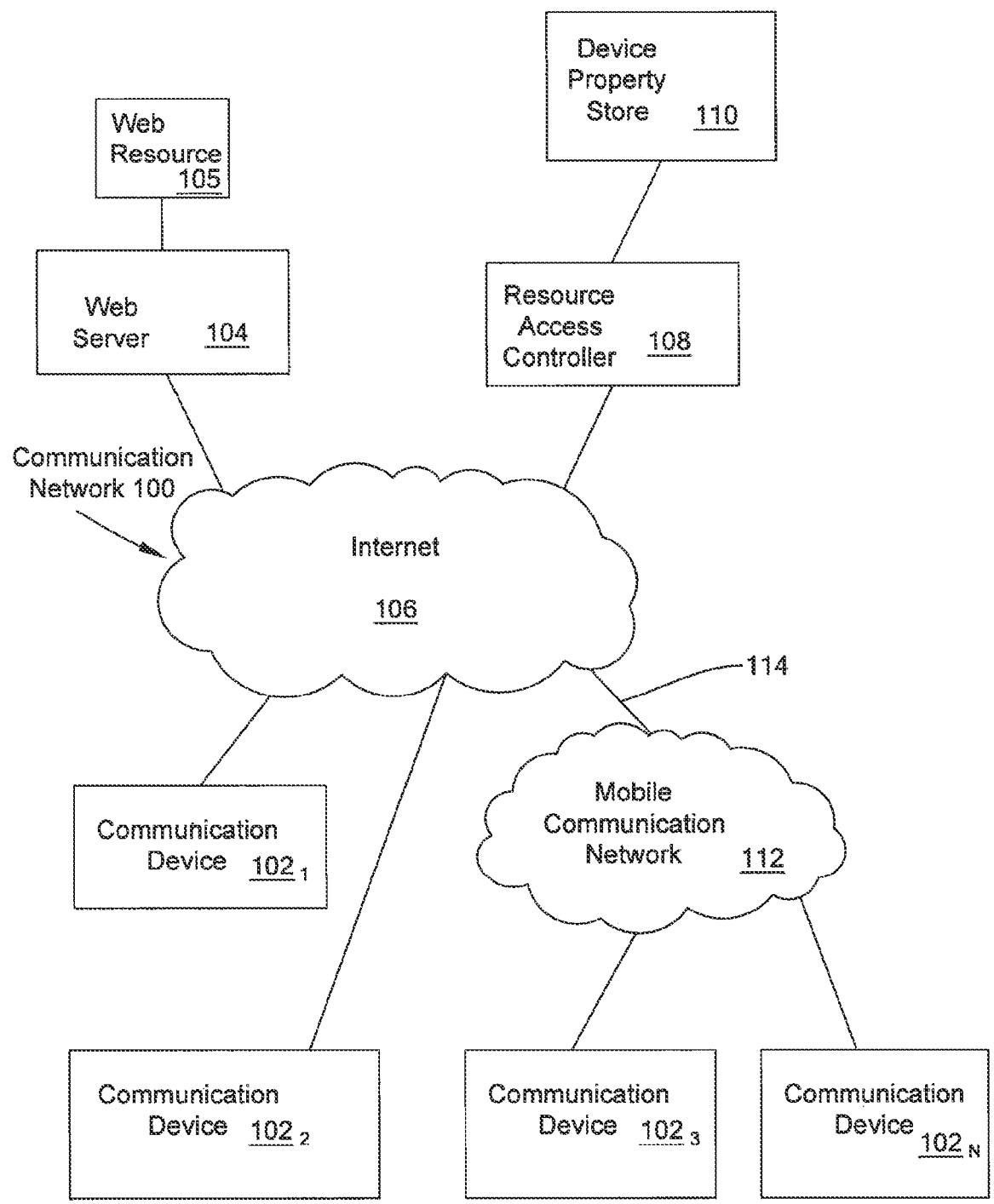
FIG. 1 is a schematic diagram of a communication network illustrating a preferred embodiment of the present disclosure.

Referring to FIG. 1, according to a first embodiment, a communication network 100 comprises a plurality of communication devices $102_{1, 2, \ldots N}$ arranged to access a web server 104 via the Internet 106. The communication network 100 includes a resource access controller 108 and a device property store 110. The plurality of communication devices $102_{1, 2, \ldots N}$ are arranged to communicate with the resource access controller 108 via the Internet 106 and the resource access controller 108 is arranged to communicate with the device property store 110. In this embodiment, the resource access controller 108 and the device property store 110 are implemented on a single computer arranged to access the Internet 106 using a hardwired broadband line. In other embodiments, the resource access controller 108 and device property store 110 comprise multiple computers or are implemented as part of the functionality of a multi-purpose computer. It is also possible for the resource access controller 108 to be implemented on one computer and the device property store 110 to be implemented on a different computer, or as a separate storage device. In this scenario, communication between the resource access controller 108 and the device property store 110 is typically via a Local Area Network (LAN) that is also part of the communication network 100, but in other embodiments it can be via the Internet 106.

The communication network 100 incorporates a mobile communication network 112; that is, a cellular radio network using an appropriate communication standard, such as Global System for Mobile Communications (GSM), Universal Mobile Telecommunications System (UMTS) or Long-Term Evolution (LTE), to provide data communication. The mobile communication network 112 is linked to the Internet 106 via a gateway 114. At least some of the communication devices $102_{1, 2, \ldots N}$ are able to access the Internet 106 and hence the web server 104 via the mobile communication network 112.

The resource access controller 108 is operable to control access to a resource by the communication devices $102_{1, 2, \ldots N}$. In this embodiment, the resource is a web resource 105 hosted on the web server 104. Specifically, the web resource 105 is a web page hosted by the web server 104, although in other embodiments it is another type of web resource, such as a data file, media file or image file. In another embodiment, the resource is part of an application 232 running on the communication device $102_{1, 2, \ldots N}$, such as the pages of a mobile banking application that lie behind a login page. In other words, the resource may be the parts of the application that require authentication to access, The web server 104 is a computer device that is able to access the Internet 106 via a suitable communication link. In different embodiments, the web server 104 comprises multiple computers or is implemented as part of the functionality of a multi-purpose computer or a general purpose computer. The communication link is a wireless or hardwired broadband connection, via a leased line, Digital Subscriber Line (DSL), optical fibre or cable. In the illustrated embodiment, the web server 104 is implemented as a single dedicated computer, and is arranged to access the Internet 106 via a DSL.

The web server 104 hosts a web site. In this embodiment, the web site is a customer support web site for the mobile communication network 112. The web site contains information useful to users of the communication devices $102_{1, 2, \ldots N}$. Such information includes explanations of how to solve common problems, and contact details for a customer support centre that can assist users with less common problems. As such, the web site comprises multiple web pages and web resources. The web resource 105, access to which is controlled by the resource access controller 108, comprises a portion of the web site. The web resource 105 might handle or contain personal information, such as a payment or account service, or facilitate purchase of products or services.

In other embodiments, the resource is a network resource, such as a hardware device or a network service. In particular, in one embodiment the resource is a service provided by the mobile communication network 112, such as data or voice communication over the mobile communication network 112. In other words, the resource access controller 108 and mobile communication network 112 may be operable to control access to communication services over the mobile communication network 112 itself. In this scenario, the resource is effectively part of the mobile communication network 112. Nonetheless, the web site hosted by the web server 104 is instrumental in managing access the resource, as explained in more detail below.

The communication devices $102_{1, 2, \ldots N}$ are any type of device capable of communicating via the Internet 106 and optionally the mobile communication network 112. Typically, communication devices $102_{1, 2, \ldots N}$ incorporating a Subscriber Identification Module (SIM) card compatible with the mobile network 112 can communicate with the Internet 106 via the mobile communication network 112. A non-exhaustive list of examples of such communication devices $102_{1, 2, \ldots N}$ includes a Smartphone, a mobile telephone, a Personal Digital Assistant (PDAs), a tablet computer, a laptop computer, an eReader, a vehicle, a vehicle communication apparatus, a vehicle entertainment apparatus, a navigation device, a tracking device and a watch.

Figure 2:
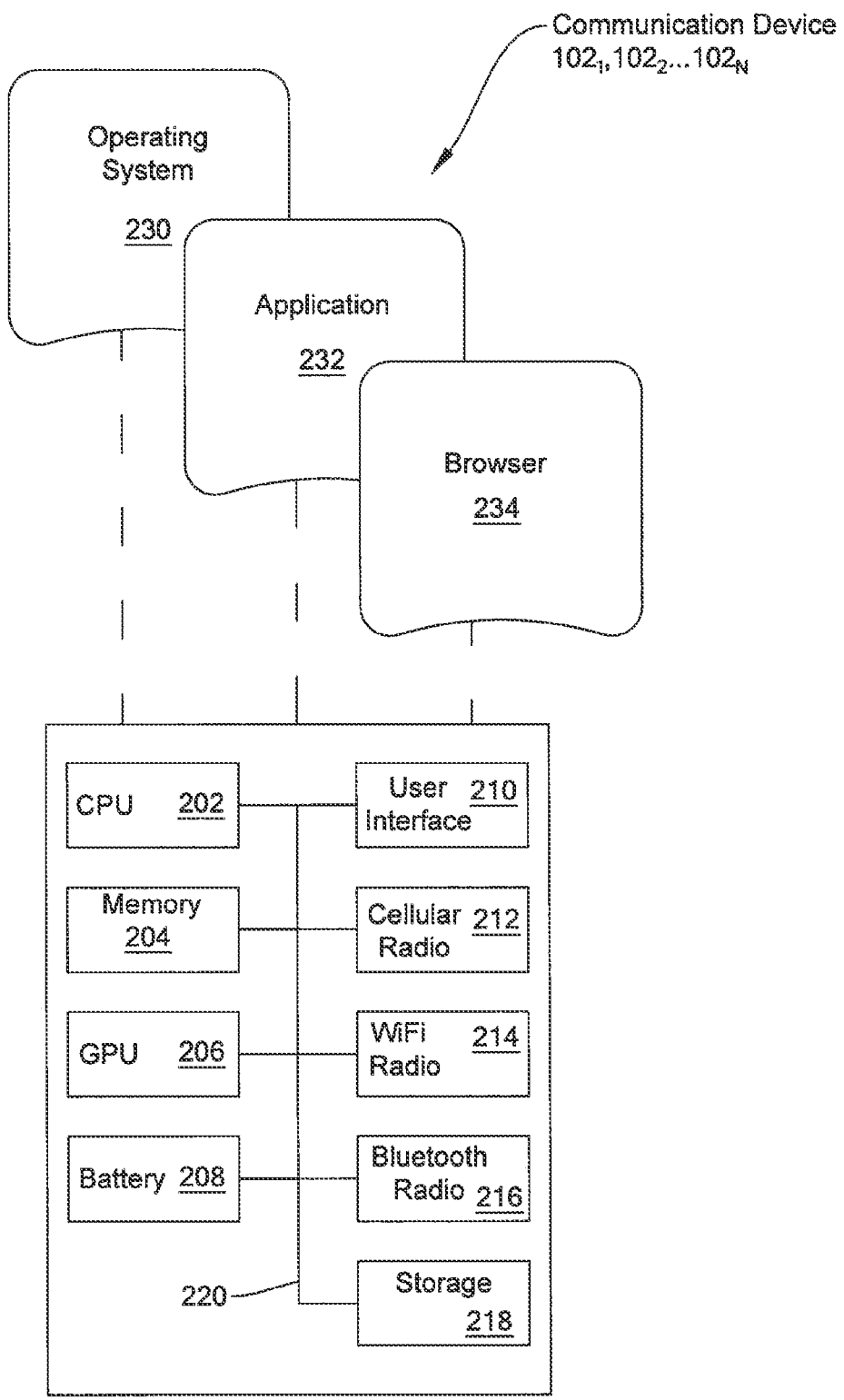
FIG. 2 is a schematic diagram of a communication device of the communication network.

In this embodiment, the communication devices $102_{1, 2, \ldots N}$ are Smartphones. Referring to FIG. 2, the communication devices $102_{1, 2, \ldots N}$ each comprise a processor in the form of a Central Processing Unit (CPU) 202, memory 204, a Graphics Processing Unit (GPU) 206, a battery 208, a user interface 210, a cellular radio unit 212, a Wi-Fi radio unit 214, a Bluetooth® radio unit 216 and storage 218. The CPU 202, memory 204, GPU 206, user interface 210, cellular radio unit 212, Wi-Fi radio unit 214, Bluetooth® radio unit 216 and storage 218 are coupled to one another via a bus 220. The communication device $102_{1, 2, \ldots N}$ is operable to run an operating system 230, which in turn supports software running on the communication device $102_{1, 2, \ldots N}$, including the application 232 and web browser 234.

The CPU 202 executes instructions, including instructions stored in the memory 204 and storage 218. The instructions executed by the processor 202 include instructions for coordinating the other components of the communication device $102_{1, 2, \ldots N}$, such as the user interface 210, cellular radio unit 212, Wi-Fi radio unit 214, Bluetooth® radio unit 216, and instructions of the operating system 230, application 232 and browser 234.

The CPU 202 is operable to communicate with a user through the user interface 210. In this embodiment, the user interface 210 comprises a display and a touch sensitive screen. The display is a Thin-Film-Transistor (TFT) Liquid Crystal Display (LCD) display or an Organic Light Emitting Diode (OLED) display, or other appropriate display.

The memory 204 is implemented as one or more of a computer-readable media, a volatile memory unit or units, or a non-volatile memory unit or units, making up Random Access Memory (RAM). Storage 218 is provided integrally with the communication device $102_{1, 2, \ldots N}$. In addition, the storage 218 may comprise removable storage connected to communication device $102_{1, 2, \ldots N}$ via an interface (not shown). The storage 218 is arranged to store computer executable code defining the operating system 230, applications 232 and browser 234, as well as instructions for operating components of the communication device $102_{1, 2, \ldots N}$. The memory 204 is also arranged to store elements of this computer executable code. Typically, the elements of the computer executable code stored by the memory 204 comprise instructions essential to basic operation of the communication device $102_{1, 2, \ldots N}$ and elements that are stored transiently whilst some particular process is handled by the CPU 202 or GPU 208.

The communication device $102_{1, 2, \ldots N}$ is arranged to communicate wirelessly via the cellular radio unit 212, Wi-Fi radio unit 214 and Bluetooth® radio unit 216. Typically, the communication device $102_{1, 2, \ldots N}$ is able to communicate via the Internet 106 using the Wi-Fi radio unit 214 when a Wi-Fi gateway is available and able to communicate via the Internet 106 using the cellular radio unit 212 when the mobile communication network 112 is available. The CPU 202 is arranged to control the cellular radio unit 212 and Wi-Fi radio unit 214 to allow the communication device $102_{1, 2, \ldots N}$ to communicate via the Internet 106 by seamlessly swapping between use of the cellular radio unit 212 and Wi-Fi radio unit 214 according to conditions. Hence, for the purposes of the present disclosure, communication devices $102_{1, 2, \ldots N}$ are illustrated as connected directly to the Internet 106 in the scenario of Wi-Fi communication and via the mobile communication network 112 in the scenario of cellular radio communication.

The cellular radio unit 212 provides for data communication under various modes. For example, second generation (2G) technologies, such as GSM General Packet Radio Service (GPRS), third generation (3G) technologies, such as UMTS High Speed Packet Access (HSPA), and fourth generation (4G) technologies, such as LTE-Advanced may all be supported. However, regardless of which mode of data communication is operating at any given time, it will be understood that communication via the Internet 106 uses Hypertext Transfer Protocol (HTTP). The HTTP layer of the communication method is generally managed by the browser 234.

The browser 234 is of a type capable of operating on whichever of the communication devices $102_{1, 2, \ldots N}$ it is installed. The browser 234 is usually of the type provided with the operating system 230 first installed on the communication device $102_{1, 2, \ldots N}$ by the manufacturer. Currently, this is Safari™ for communication devices $102_{1, 2, \ldots N}$ having the Apple™ iOS operating system, Chrome™ for communication devices $102_{1, 2, \ldots N}$ having the Android™ operating system or Microsoft Edge™ for communication devices $102_{1, 2, \ldots N}$ having the Windows 10 Mobile™ operating system. However, it is possible for users to change the browser 234 of a communication device $102_{1, 2, \ldots N}$, and this is accounted for by method described below.

Figure 3:
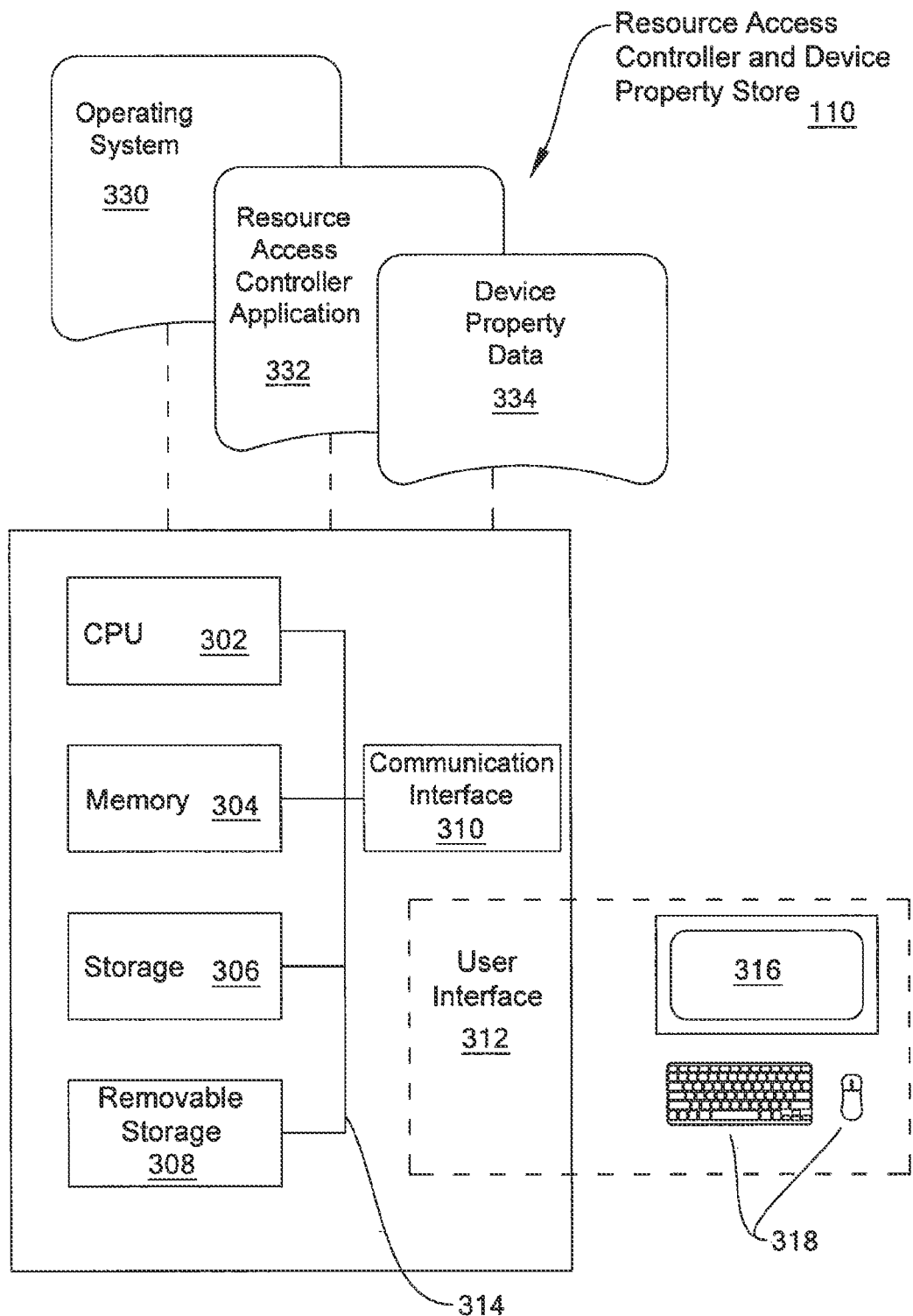
FIG. 3 is a schematic diagram of a resource access controller and device property store of the communication network.

Referring to FIG. 3, the resource access controller 108 and device property store 110 together comprise a processor in the form of a CPU 302, a memory 304, an integrated storage device 306, a removable storage device 308, a communication interface 310 and a user interface 312 coupled to one another by a bus 314. The user interface 312 incorporates a display 316 and an input-output device 318, which in this embodiment is a keyboard and mouse.

The CPU 302 executes instructions, including instructions stored in the memory 304, the integrated storage device 306 and/or removable storage device 308.

The memory 304 stores instructions and other information for use by the CPU 302. The memory 304 is the main memory of the computer. It usually comprises both Random Access Memory (RAM) and Read Only Memory (ROM).

The integrated storage device 306 provides mass storage for the resource access controller 108 and device property store 110. In different implementations, the integral storage device 306 is a hard disk device, a flash memory or some other similar solid state memory device, or an array of such devices.

The removable storage device 308 provides auxiliary storage for the resource access controller 108 and device property store 110. In different implementations, the removable storage device 306 is a floppy disk drive, optical disk drive, such as a Compact Disk (CD) drive or Digital Versatile Disk (DVD) drive, a portable flash drive or some other similar portable solid state memory device, or an array of such devices.

A computer program product is provided that includes instructions for carrying out the method described below. The computer program product is stored, at different stages, in any one of the memory 304, integrated storage device 306 and removable storage device 308. The storage of the computer program product is non-transitory, except when instructions included in the computer program product are being executed by the processor 302, in which case the instructions are sometimes stored temporarily in the memory 304. It should also be noted that the removable storage device 308, or a part of the removable storage device 308 carrying information, such as a CD or DVD, can be removed from the resource access controller 108 and device property store 110, such that the computer program product is held separately from the resource access controller 108 and device property store 110 from time to time. Elements of the computer software product may also be present on the communication devices $102_{1, 2, \ldots N}$, as evident from the description below.

The communication interface 310 is typically an Ethernet network adaptor coupling the bus 314 to an Ethernet socket. The Ethernet socket is coupled to a modem that provides access to the Internet 106 via the hardwired broadband line. The Ethernet socket is usually coupled to the modem via a wired connection, but the connection could alternatively be wireless. In other embodiments, the resource access controller 108 and device property store 110 incorporate the modem. In this embodiment, the modem is a broadband modem, but it can alternatively be any suitable type of modem, such as an optical network unit.

Since the communication devices $102_{1, 2, \ldots N}$, the web server 104 and the resource access controller 108 are connected to the Internet 106, they can communicate with one another via the Internet 106. The communication devices $102_{1, 2, \ldots N}$, the web server 104 and the resource access controller 108 communicate with one another using a communication protocol. In this embodiment, the communication protocol is Hypertext Transfer Protocol (HTTP).

In one embodiment, the resource access controller 108 hosts a web page component. As such, the resource access controller 108 is effectively a web server. The web page component comprises first computer executable code arranged to cause the communication devices $102_{1, 2, \ldots N}$ to perform operations. In this embodiment, the web page component comprises HyperText Markup Language (HTML) and JavaScript™ code.

The web site hosted by the web server 104 includes second computer executable code arranged to direct the communication devices $102_{1, 2, \ldots N}$ to the web page component hosted by the resource access controller 108. In this embodiment, the second computer executable code is an HTML iframe. This second computer executable code defines, amongst other things, the position and dimensions of a part of the web page in which the web page component is to be rendered by the browser 234 of the communication devices $102_{1, 2, \ldots N}$. In some instances, the first computer executable code includes the content to be displayed in the iframe. Where content is to be displayed in the iframe, the iframe is defined as having dimensions suitable for displaying the content. However, this is not always necessary. It is also possible for no content to be provided in the first computer executable code for display in the iframe. This means that the iframe can be defined by the second computer executable code as having zero dimensions, e.g. zero pixels high and zero pixels wide, and that the iframe is not visible when the second computer executable code is rendered by the browser 234 of one of the communication devices $102_{1, 2, \ldots N}$.

As part of the definition of the iframe, the second computer executable code comprises link to the web page component hosted by the resource access controller 108. When the iframe is loaded by the browser 234 of the communication device $102_{1, 2, \ldots N}$, the link causes the subject communication device $102_{1, 2, \ldots N}$ to transmit a request for the web page component to the resource access controller 108. In response to the request, the resource access controller 108 transmits the web page component to the subject communication device $102_{1, 2, \ldots N}$ for rendering (but not necessarily display) in the iframe by the web browser 234 of the communication device $102_{1, 2, \ldots N}$.

In a variation to this embodiment, instead of an iframe, the second computer executable code loads the web page component as a JavaScript™ library. That is, the first computer executable code comprises a JavaScript™ library loadable by the web page.

In another embodiment, the first computer executable code is stored by one of the communication devices $102_{1, 2, \ldots N}$ as part of the application 232. The application 232 communicates with the resource access controller 108 over the internet 106, but is not a web browser per se. In this case, the first computer executable code is JavaScript™ that runs within the application 232 and the second computer code is part of the application that presents the user with an option to access the resource and initiate running of the first computer code within the application 232.

The device property store 110 stores information about properties of the communication devices $102_{1, 2, \ldots N}$. Specifically, the device property store 110 stores values of attributes of the communication devices $102_{1, 2, \ldots N}$.

A property is a characteristic of a communication device $102_{1, 2, \ldots N}$, such as a physical feature or capability of the communication device $102_{1, 2, \ldots N}$ or its software. Each property is considered to comprise an attribute having a value. In other words, an attribute is the nature of the property and the value is the measure of the property. For example, screen width is a property defined by an attribute of "number of pixels across the width of the screen" and a value of "150 pixels". In another example, ability to display Joint Photographic Experts Group (JPEG) images is a property defined by an attribute of "Support for displaying JPEG images?" and a value of "true" (or "false"). In another example, the operating system version of a communication device $102_{1, 2, \ldots N}$ is a property defined by an attribute of "operating system version number" and a value of "8.2.1". In yet another example, the manufacturer of a communication device $102_{1, 2, \ldots N}$ is a property defined by an attribute of "name of manufacturer" and a value of "Apple". It can therefore be appreciated that the values can be Boolean, numbers or strings.

Values are stored for the same attributes for different types of the communication devices $102_{1, 2, \ldots N}$. In other words, for each type of device $102_{1, 2, \ldots N}$, the device property store 110 includes values for the same set of attributes.

The device property store 110 also stores confidence parameters for the values. Each confidence parameter represents the probability that an actual communication device $102_{1, 2, \ldots N}$ with the same User Agent string, TAC or such like as that by which the set of properties is indexed has the value stored in the device property store 110 for the attribute to which confidence parameter applies.

The values are indexed according to User Agent strings associated with the different types of communication devices $102_{1, 2, \ldots N}$. A User Agent string is a string found in request headers of requests sent by web browsers using HTTP. User Agent strings are usually unique to the type of the subject communication device type $102_{1, 2, \ldots N}$ and its web browser. It may also be unique to the version of the type of the subject communication device $102_{1, 2, \ldots N}$ and/or its web browser, that is updates that may have been made to the subject communication device $102_{1, 2, \ldots N}$ and/or its web browser since they were first manufactured or supplied to the user. So, in this embodiment, all communication devices $102_{1, 2, \ldots N}$ having the same User Agent string are considered to be the same type of communication device $102_{1, 2, \ldots N}$.

In this embodiment, the properties stored in the device property store 110 are stored as described in patent publication no. WO2009/101414, the entire content of which is incorporated herein by reference. This means that the User Agent strings in the device property store 110 are arranged in a trie based on traversing the characters of the User Agent strings from left to right. Properties are indexed at nodes of the trie, positioned at the highest node in the tree at which the property is common to all communication devices $102_{1, 2, \ldots N}$ having a User Agent string referenced by the node.

In addition, the values are indexed according to a User Agent Profile and Type Allocation Code (TAC) of the type of communication device $102_{1, 2, \ldots N}$. The User Agent Profile is generally found in the HTTP header and takes the form of a URL linking to a profile of device characteristics. The User Agent Profile is generally unique to the type of communication device $102_{1, 2, \ldots N}$, so the User Agent Profile can be used to index the values in the device property store in a similar way to the User Agent header. The TAC is again a string or code unique to the to the type of communication device $102_{1, 2, \ldots N}$. Since a TAC is only 8 digits long, it may be less helpful to use a trie for the TACs, as a simple look up table may suffice. However, the set of values of each type of communication device $102_{1, 2, \ldots N}$ is accessible in the device property store using the TAC. It is also possible to query and retrieve the sets of values for the different types of communication device $102_{1, 2, \ldots N}$ using other unique identifiers in the device property store, such as the Vendor Model Number.

A fictional example of the properties stored in the device property store 110 is given in Table 1 below, for a type of communication device $102_{1, 2, \ldots N}$ indexed by user agent string having Vendor Model Number iPhone 6 A1549.

TABLE 1

User Agent String: Mozilla/5.0 (iPhone; CPU iPhone OS 7_0 like Mac OS X) AppleWebKit/546.10 (KHTML, like Gecko) Version/6.0 Mobile/7E18WD Safari/8536.25
User Agent Profile: http://nds1.nds.apple.com/uaprof/A1549ir200.xml

| Attribute | Value | Confidence |
| --- | --- | --- |
| Device Vendor | Apple | 99.9% |
| Device Model (Vendor Model Number) | iPhone 6 | 99.9% |
| Manufacturer | Apple | 99.9% |
| Screen Width | 750 | 99.9% |
| Screen Height | 1334 | 99.9% |

TABLE 1-continued

User Agent String: Mozilla/5.0 (iPhone; CPU iPhone OS 7_0 like Mac OS X) AppleWebKit/546.10 (KHTML, like Gecko) Version/6.0 Mobile/7E18WD Safari/8536.25
User Agent Profile: http://nds1.nds.apple.com/uaprof/A1549ir200.xml

| Attribute | Value | Confidence |
| --- | --- | --- |
| Screen Color Depth | 24 | 99.9% |
| NFC | True | 99.9% |
| Camera | 8.0 | 99.9% |
| CPU Speed Score | >2.4 | 86.5% |
| Operating System Name | iOS | 99.9% |
| Operating System Version | 8 | 99.9% |
| Operating System Android | False | 99.9% |
| Operating System Bada | False | 99.9% |
| Operating System iOS | True | 99.9% |
| Operating System Rim | False | 99.9% |
| Operating System Windows Mobile | False | 99.9% |
| Browser Name | Safari | 99.9% |
| Browser Rendering Engine | WebKit | 99.9% |
| Markup XHTML MP 1.2 | True | 99.9% |
| Image Gif87 | True | 99.9% |
| Image GIF89A | True | 99.9% |
| Image JPG | True | 99.9% |
| Image PNG | True | 99.9% |
| Cookie | True | 99.9% |
| Hypertext Transfer Protocol Secure (HTTPS) | True | 99.9% |
| Memory Limit Download | 0 | 99.9% |
| Flash Capable | False | 93.3% |
| Java Script Support Basic Java Script | True | 98.0% |
| General Packet Radio Service (GPRS) | True | 99.9% |
| Enhanced Data rates for GSM Evolution | True | 99.9% |
| High-Speed Downlink Packet Access (HSDPA) | True | 99.9% |
| Universal Mobile Telecommunications System | True | 99.9% |
| Evolved High-Speed Packet Access (HSPA+) | True | 99.9% |
| Long Term Evolution (LTE) | True | 99.9% |
| LTE Category | 4 | 99.9% |
| Stream 3GP H.264 Level 1.3 | True | 99.9% |
| Stream 3GPP H.263 | False | 99.9% |
| 3GP H.264 Level 1.3 | True | 99.9% |
| MP4 H.264 Level 1.3 | True | 99.9% |

Figure 4:
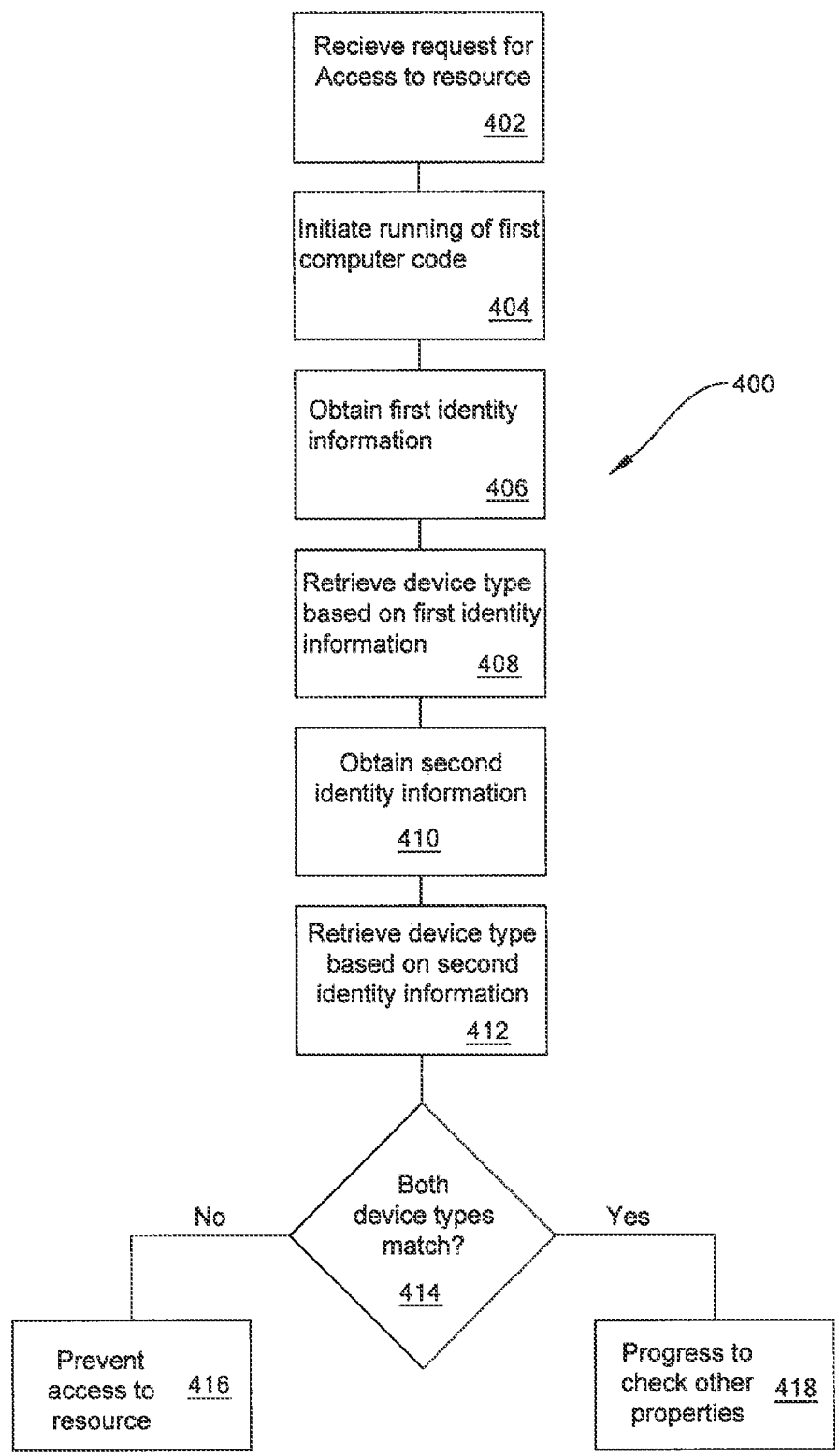
FIG. 4 is a flowchart illustrating a first stage of a method of preventing access to a resource by a counterfeit communication device operating in the communication network.

Referring to FIG. 4, in a first stage 400 of a method of preventing a communication device $102_{1, 2, \ldots N}$ from accessing a resource, at step 402, a communication device $102_{1, 2, \ldots N}$ first requests access to the resource. In this embodiment, the request is in the form of an HTTP request sent to the web server 104 for the web server 104 to deliver the web resource 105 to the communication device $102_{1, 2, \ldots N}$. However, where the resource is a network resource managed by the mobile communication network 112, the request may be in the form of an HTTP request to the web server 104 for permission to access the network resource. Where the resource is already present on the communication device $102_{1, 2, \ldots N}$ as part of the application 232, the request may be in the form of an attempt to access the resource within the application 232.

The communication device $102_{1, 2, \ldots N}$ making the request can be any of the communication devices $102_{1, 2, \ldots N}$. For the purposes of the present description, the communication device $102_{1, 2, \ldots N}$ sending the request for the resource and consequently being subjected to the method is referred to as the subject communication device $102_{1, 2, \ldots N}$.

In one embodiment, the subject communication device $102_{1, 2, \ldots N}$ first sends an HTTP request to the web server 104 for a web page of the web site hosted by the web server 104, which web page includes the second computer executable code. The web server 104 delivers the web page to the subject communication device $102_{1, 2, \ldots N}$ in response to the request. When the web browser 234 of the subject communication device $102_{1, 2, \ldots N}$ renders the web page, the second computer executable code directs the subject communication device $102_{1, 2, \ldots N}$ to the web page component hosted by the resource access controller 108. In response to this request, at step 402, the resource access controller 108 delivers the web page component to the subject communication device $102_{1, 2, \ldots N}$. In another of the embodiments, the user of the subject communication device attempts to access the resource via the application 232 running on the subject communication device $102_{1, 2, \ldots N}$, and this causes the first computer code to start running in the application 232.

The HTTP request includes a request header and the request header includes a User Agent string associated with the subject communication device $102_{1, 2, \ldots N}$. It also usually includes a User Agent Profile. Similarly, the application 232 can access the memory 204 and/or storage 218 of the subject communication device $102_{1, 2, \ldots N}$ to retrieve the User Agent Profile or TAC of the subject communication device $102_{1, 2, \ldots N}$. In another embodiment, the TAC is retrieved by polling the mobile communication network 112, which has knowledge of the TAC whenever the subject communication device $102_{1, 2, \ldots N}$ communications over the mobile communication network 112.

In more detail, at step 406, first identity information is obtained, in the form of the User Agent string or the User Agent Profile. The resource access controller 108 uses this first identity information, at step 408, to search for the device type in the device property store 110. This is usually achieved by retrieving the Vendor model number associated with the User Agent string or the User Agent Profile in the device property store 110.

Next, at step 410, second identity information is obtained, in the form of the User Agent Profile (where this was not the first identity information) or TAC. The resource access controller 108 uses this information, at step 412, to search for the device type in the device property store 110. Again, this is usually achieved by retrieving the Vendor model number associated with the User Agent Profile or TAC in the device property store 110.

At step 414, the device type based on the first identity information is compared to the device type based on the second identity information, e.g. the two retrieved Vendor model numbers are compared to one another. If the device type based on the first identity information is not the same, e.g. does not match, the device type based on the second identity information, the subject communication device $102_{1, 2, \ldots N}$ is determined to be counterfeit. On the other hand, if the device type based on the first identity information is the same as, e.g. matches, the device type based on the second identity information, it is much less likely that the subject communication device $102_{1, 2, \ldots N}$ is counterfeit.

In one embodiment, the method ends here, with a determination having been made that the subject communication device $102_{1, 2, \ldots N}$ is counterfeit or not. However, in order to improve reliability, in other embodiments, the method continues. In particular, if the device type based on the first identity information is not the same as the device type based on the second identity information, at step 416 the subject communication device $102_{1, 2, \ldots N}$ is prevented from accessing the resource. On the other hand, if the device type based on the first identity information is the same as the device type based on the second identity information, at step 418 the method progresses to make further checks.

Figure 5:
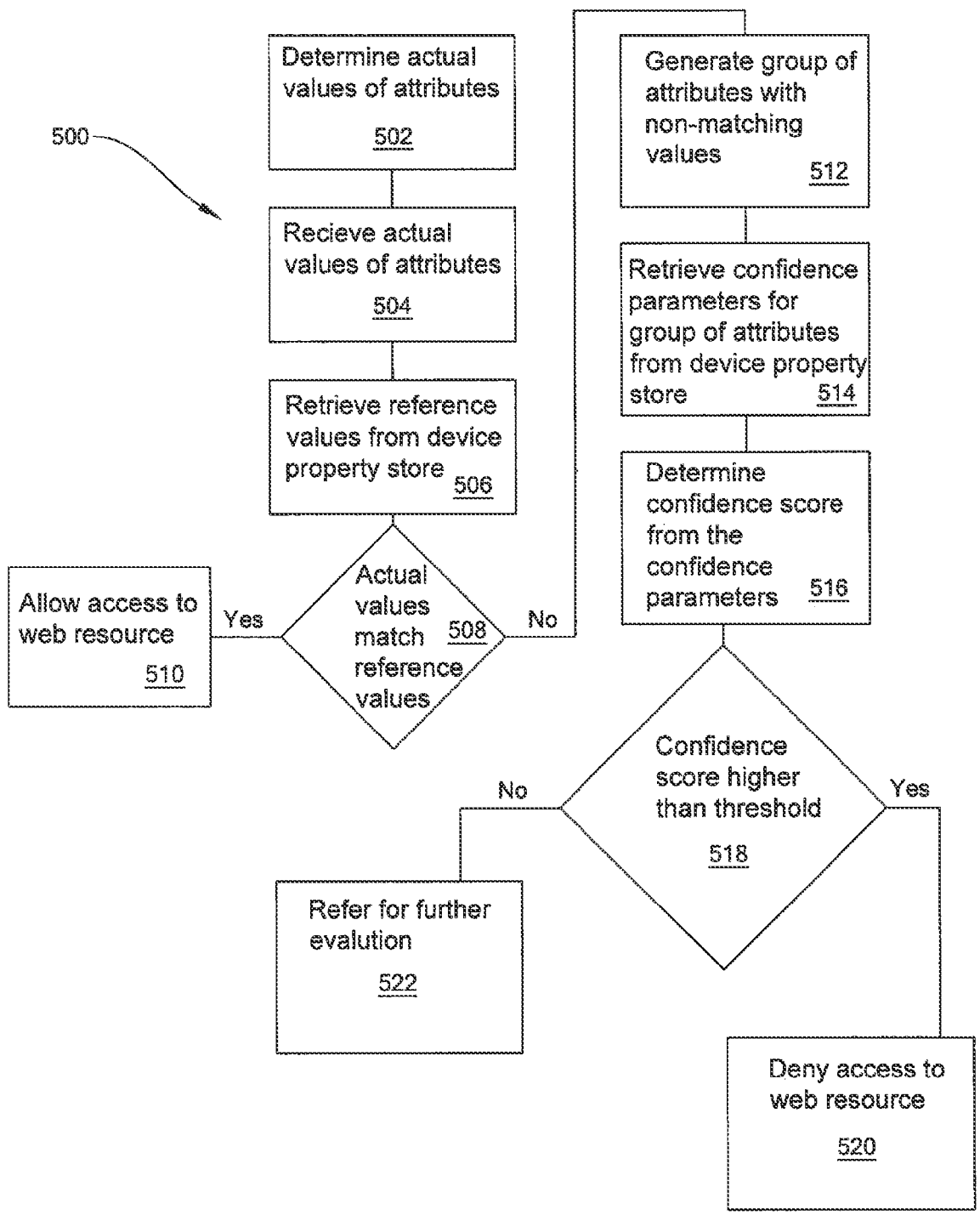
FIG. 5 is a flowchart illustrating a second stage of the method preventing access to a resource by a counterfeit communication device operating in the communication network.

Referring to FIG. 5, in a second stage 500 of the method of preventing a communication device $102_{1, 2, \ldots N}$ from accessing a resource, the first computer executable code proceeds, at step 502, to determine properties of the subject communication device $102_{1, 2, \ldots N}$. Specifically, the web page component determines actual values of attributes of the subject communication device $102_{1, 2, \ldots N}$. This involves retrieving values from a memory of the subject communication device $102_{1, 2, \ldots N}$. It also involves testing the subject communication device $102_{1, 2, \ldots N}$ to establish values of other attributes of the subject communication device $102_{1, 2, \ldots N}$.

The first computer executable code retrieves actual values of attributes of the subject communication device $102_{1, 2, \ldots N}$ from the memory of the subject communication device $102_{1, 2, \ldots N}$ by looking up values in the memory of the subject communication device $102_{1, 2, \ldots N}$. Examples of attributes whose values are retrieved in this way can be found in Table 1.

The first computer executable code also tests the subject communication device $102_{1, 2, \ldots N}$ to establish actual values of other attributes of the subject communication device $102_{1, 2, \ldots N}$ by requesting the subject communication device $102_{1, 2, \ldots N}$ to perform operations. For example, the web page component requests the CPU 202 of the subject communication device $102_{1, 2, \ldots N}$ to process third computer executable code and measures the time it takes for the third computer executable code to be processed by the CPU 202. This allows the web page component to determine the speed of the CPU 202 of the subject communication device $102_{1, 2, \ldots N}$. This test returns an actual value for the attribute of "CPU score".

Once the first computer executable code has determined the properties of the subject communication device $102_{1, 2, \ldots N}$, in one embodiment it transmits the actual values of the attributes to the resource access controller 108, which in turn receives them at step 504. In an alternative embodiment, the actual values are received and stored by the subject communication device $102_{1, 2, \ldots N}$ for analysis by the subject communication device $102_{1, 2, \ldots N}$.

At step 506, the resource access controller 108 or the subject communication device $102_{1, 2, \ldots N}$ (depending on the embodiment) uses the first or second identity information, such as the User Agent string or TAC, to look up reference values for the attributes in the device property store 110. In one embodiment, this involves comparing the stored User Agent string to the User Agent strings in the device property store 110. In order to do this, the a query is sent to the device property store 110 including the stored User Agent string. The query uses the stored User Agent string to traverse the tree of User Agent strings in the device property store 110, retrieving properties indexed at the nodes of the tree that it passes. If the stored User Agent string directly matches a User Agent string in the device property store 110, the query causes all the properties for the type of communication device $102_{1, 2, \ldots N}$ associated with the User Agent string to be retrieved from the device property store 110. If the stored User Agent string is not exactly the same as User Agent string in the device property store 110, then just the properties indexed at nodes of the tree referenced by an initial part of a User Agent string in the device property store 110 that matches the stored User Agent string are retrieved.

Once the resource access controller 108 has retrieved the properties from the device property store 110, it compares the actual values of the attributes to the reference values of the attributes, at step 508. If all of the actual values are the same as the reference values, the resource access controller 108 or subject communication device $102_{1, 2, \ldots N}$ determines, at step 510, that the subject communication device $102_{1, 2, \ldots N}$ is allowed to access the resource. Alternatively, if an actual value of any of the attributes is different to the reference value for that attribute, the resource access controller 108 generates, at step 512, a group of attributes for which the actual value is different to the reference value.

At step 514, the confidence parameters for the reference values are retrieved from a device property store 110. The confidence parameters are combined, at step 516, to generate a confidence score for the subject communication device $102_{1...N}$. In more detail, an average of the confidence values of the group of attributes for which the actual value is different to the reference value is found. This average will be high if the reference values of the attributes in the group are considered to be known with a high degree of confidence. Alternatively, if there are attributes in the group for which the reference values are known with less certainty, for example because the value changes frequently due to software or firmware updates or such like, then the confidence score will be lower.

At step 518, the confidence score is used to determine whether or not to prevent the subject communication device $102_{1...N}$ from accessing the resource. In this embodiment, this is achieved by comparing the confidence score to a threshold. If the confidence score is higher than the threshold, then, at step 520, the subject communication device $102_{1...N}$ is prevented from accessing the resource. On the other hand, if the confidence score is lower than the threshold, then in one embodiment, the subject communication device $102_{1...N}$ is allowed to access the resource. However, in the illustrated embodiment, at step 522, the subject communication device $102_{1...N}$ is instead referred for further assessment.

Preventing access to the resource is implemented within the application 232 of the communication device $102_{1...N}$, or by sending a token to the web server 104 indicative of permission to denial of permission to access the resource. It is also possible to store the result of the method, for example as a cookie in the web browser 234.

In an alternative embodiment, a group of attributes for which the actual values and the reference values match can be selected, and the confidence score can be calculated using reference values of those attributes. It is also possible to apply weightings to the each of the confidence parameters before calculating the average or otherwise combining, processing or considering the confidence parameters to generate the confidence scores.

The described embodiments of the invention are only examples of how the invention may be implemented. Modifications, variations and changes to the described embodiments will occur to those having appropriate skills and knowledge. These modifications, variations and changes may be made without departure from the scope of the claims.

For example, the resource access controller 108 is described as being implemented in a server and the device property store 110 is implemented in a memory device of the server. This is not essential. The resource access controller 108 and device property store 110 may be separate from one another. They may additionally be located at different physical locations. This may mean that they communicate with each other via a Local Area Network (LAN) or via the Internet 106.

The invention claimed is:

1. A method of determining that a subject electronic device is counterfeit, the method comprising:

receiving a request from the subject device over a communications network, the subject device being of a device type, the device type representing a plurality of different communication devices, the request including first identity information representing the device type of the subject device, wherein the first identity information comprises one of the following identifiers: an IMEI, a TAC or a portion of an HTTP header;

receiving second identity information representing the device type of the subject device, wherein the second identity information comprises one of the following identifiers: an IMEI, a TAC or a portion of an HTTP header, and wherein the identifier of the second identity information is different to the identifier of the first identity information;

in response to the request, delivering computer executable code to the subject electronic device, which the computer executable code when executed by the subject electronic device determines, by the performing of one or more operations, values from the memory of the subject electronic device corresponding to a plurality of attributes of the subject electronic device;

receiving values from the subject electronic device corresponding to the plurality of attributes from the computer executable code;

retrieving from a device property store: first reference values corresponding to the plurality of attributes for the device type of the subject device based on the first identity information, and second reference values corresponding to the plurality of attributes for the device type of the subject device based on the second identity information; and determining that the subject device is counterfeit when: at least one of the first reference values of the plurality of attributes is different to the second reference value of that attribute; and at least one of the values from the subject electronic device corresponding to the plurality of attributes is different to the first and/or second reference value of that attribute, wherein the first reference values, second reference values, and values from the subject electronic device relate to the same plurality of attributes.

2. The method of claim 1, wherein the request is for access to a resource of the communications network.

3. The method of claim 1, wherein the request is for a specified web page component.

4. The method of claim 3, wherein the computer executable code is the specified web page component, the specified web page component for rendering by a browser of the subject electronic device in order to perform the one or more executable operations to determine the properties of the subject electronic device.

5. The method of claim 1, wherein the plurality of attributes are retrieved from the memory by the computer executable code for a module, the module including: an applications module; an operating system module; or a hardware module; or a combination thereof.

6. The method of claim 1, wherein the computer executable code is an application executable by an operating system of the subject electronic device.

7. The method of claim 1, wherein the computer executable code comprises first instructions executable by a processor of the subject electronic device to retrieve one or more values from the subject electronic device corresponding to the plurality of attributes stored by the subject electronic device and second instructions executable by the subject electronic device to test a component of the subject electronic device to determine a value from the subject electronic device representative of performance of the component.

8. The method of claim 1, further comprising implementing said determining by:
  comparing the values from the subject electronic device corresponding to the plurality of attributes to the first and/or second reference value of those attributes to identify a group of attribute for which the values from the subject electronic device and the first and/or second reference value either do or do not match;
  retrieving from the device property store a confidence parameter for each of the first and/or second reference values of the group of attributes;
  determining a confidence score for the subject electronic device by combining the confidence parameters of the first and/or second reference values of the group of attributes.

9. The method of claim 8, which further comprises:
  comparing the confidence score to a threshold; and
  said determining being in response to the comparison.

10. The method of claim 8, wherein the confidence score is further determined by applying a weighting to each of the confidence parameters and by combining the confidence parameters based on the applied weightings, the applied weightings retrieved from the device property store.

11. The method of claim 1, which comprises: receiving the first or second identity information representing the identity of the subject electronic device; and selecting the reference values of the plurality of attributes based on the first or second identity information.

12. The method of claim 11, wherein receiving the first or second identity information comprises the request received from the subject electronic device including the first or second identity information.

13. The method of claim 12, wherein the identity information is a portion of a Hypertext Transfer Protocol (HTTP) header of the request and wherein the portion is a User-Agent string.

14. The method of claim 11, wherein receiving the first or second identity information comprises receiving the first or second identity information from a mobile network of the communications network via which the subject electronic device sends the request.

15. An apparatus for determining that a subject electronic device is counterfeit, the apparatus comprising a server arranged to:
  receive a request from the subject electronic device over a communications network, the subject device being of a device type, the device type representing a plurality of different communication devices, the request including first identity information representing the device type of the subject device, wherein the first identity information comprises one of the following identifiers: an IMEI, a TAC or a portion of an HTTP header;
  receive second identity information representing the device type of the subject communication device, wherein the second identity information comprises one of the following identifiers: an IMEI, a TAC or a portion of an HTTP header, and wherein the identifier of the second identity information is different to the identifier of the first identity information;
  in response to the request, deliver computer executable code to the subject electronic device, which the computer executable code when executed by the subject electronic device determines, by the performing of one or more operations, values from the memory of the subject electronic device corresponding to a plurality of attributes of the subject electronic device;
  receive values from the subject electronic device corresponding to the plurality of attributes from the computer executable code;
  retrieve from a device property store: first reference values corresponding to the plurality of attributes for the device type of the subject device based on the first identity information, and second reference values corresponding to the plurality of attributes for the device type of the subject device based on the second identity information; and
  determine that the subject device is counterfeit when: at least one of the first reference values of the plurality of attributes is different to the second reference value of that attribute; and at least one of the values from the subject electronic device corresponding to the plurality of attributes is different to the first and/or second reference value of that attribute,
  wherein the first reference values, second reference values, and values from the subject electronic device relate to the same plurality of attributes.

16. A method of determining that a subject electronic device is counterfeit, which method comprises:
  receiving a request from the subject device for downloading a mobile app to the subject electronic device, the subject device being of a device type, the device type representing a plurality of different communication devices, the request including first identity information representing the device type of the subject device, wherein the first identity information comprises one of the following identifiers: an IMEI, a TAC or a portion of an HTTP header;
  configuring a component associated with the mobile app, the component being computer executable code;
  receiving second identity information representing the device type of the subject device, wherein the second identity information comprises one of the following identifiers: an IMEI, a TAC or a portion of an HTTP header, and wherein the identifier of the second identity information is different to the identifier of the first identity information;
  in response to the request, sending the computer executable code to the subject electronic device, which the computer executable code when executed by the subject electronic device determines, by the performing of one or more operations, values from the memory of the subject electronic device corresponding to a plurality of attributes of the subject electronic device;
  receiving values from the subject electronic device corresponding to the plurality of attributes from the computer executable code;
  retrieving from a device property store: first reference values corresponding to the plurality of attributes for the device type of the subject device based on the first identity information, and second reference values corresponding to the plurality of attributes for the device type of the subject device based on the second identity information; and
  determining that the subject device is counterfeit when: at least one of the first reference values of the plurality of attributes is different to the second reference value of that attribute; and at least one of the values from the subject electronic device corresponding to the plurality of attributes is different to the first and/or second reference value of that attribute,
  wherein the first reference values, second reference values, and values from the subject electronic device relate to the same plurality of attributes.

17. An apparatus for determining that a subject electronic device is counterfeit, the apparatus comprising a server arranged for:
- receiving a request from the subject device for downloading a mobile app to the subject electronic device, the subject device being of a device type, the device type representing a plurality of different communication devices, the request including first identity information representing the device type of the subject device, wherein the first identity information comprises one of the following identifiers: an IMEI, a TAC or a portion of an HTTP header;
- configuring a component associated with the mobile app, the component being computer executable code;
- receiving second identity information representing the device type of the subject device, wherein the second identity information comprises one of the following identifiers: an IMEI, a TAC or a portion of an HTTP header, and wherein the identifier of the second identity information is different to the identifier of the first identity information;
- in response to the request, sending the computer executable code to the subject electronic device, which the computer executable code when executed by the subject electronic device determines, by the performing of one or more operations, values from the memory of the subject electronic device corresponding to a plurality of attributes of the subject electronic device;
- receiving values from the subject electronic device corresponding to the plurality of attributes from the computer executable code;
- retrieving from a device property store: first reference values corresponding to the plurality of attributes for the device type of the subject device based on the first identity information, and second reference values corresponding to the plurality of attributes for the device type of the subject device based on the second identity information; and
- determining that the subject device is counterfeit when: at least one of the first reference values of the plurality of attributes is different to the second reference value of that attribute; and at least one of the values from the subject electronic device corresponding to the plurality of attributes is different to the reference value of that attribute,
- wherein the first reference values, second reference values, and values from the subject electronic device relate to the same plurality of attributes.

* * * * *